Nov. 23, 1965   J. G. KNOWLES   3,219,057

CHECK VALVES

Filed July 2, 1962

INVENTOR.
JOHN G. KNOWLES
BY
ATTORNEY

United States Patent Office 3,219,057
Patented Nov. 23, 1965

3,219,057
CHECK VALVES
John G. Knowles, 992 Huntingdon Pike,
Huntingdon Valley, Pa.
Filed July 2, 1962, Ser. No. 206,626
4 Claims. (Cl. 137—539)

This invention relates to check valves, and more particularly to such valves for use in pumps and the like and in lines carrying fluids.

The principal object of the present invention is the provision of a simple and inexpensive valve for preventing fluid flow in a predetermined direction.

It is a further object of this invention to provide a check valve which is simple in construction and which does not require close tolerances in its manufacture.

It is another object of the invention to provide a spring loaded ball valve which may be substituted for other ball check valves.

It is a further object of this invention to provide a simply constructed cage for confining a ball valve and its loading spring, such cage being a zig-zag construction of wire.

It is a further object of the present invention to provide a guide for a valve ball which insures precise seating of the ball and avoids fluctuating seating, especially at high pressures.

Other objects and advantageous features of the invention will be apparent from the description and claims.

The nature and characteristic features of the invention will be more readily understood from the following description, taken with the accompanying drawings forming a part thereof, in which.

Figure 1:
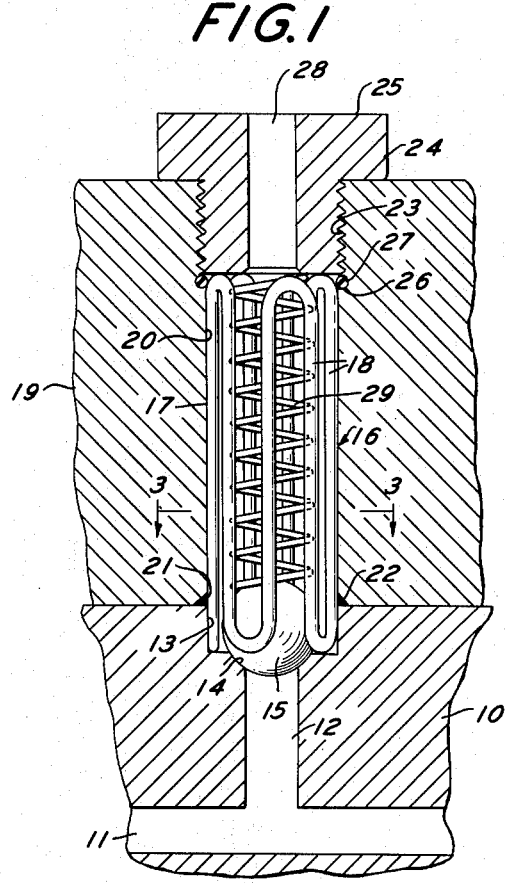
FIGURE 1 is a vertical section through a suitable body containing the valve and showing the valve assembly in elevation.

It should, of course, be understood that the description and drawings herein are illustrative merely, and that various modifications and changes can be made in the structure disclosed without departing from the spirit of the invention.

Like numerals refer to like parts throughout the several views.

Referring now to the drawings, numeral 10 designates a body, such as a connection block, pump line base or the like, having openings 11 therein for receiving fluid which will flow to the passageway 12. In the body 10, at the upper end of the passageway 12, there is a counterbored portion 13 at the bottom of which there is a valve seat 14 which can, if desired, be concave spherical, to accommodate a valve ball 15.

The counterbored portion 13 is of sufficient diameter to receive a valve cage 16, which is formed by bending a wire 17 into a series of zig-zag circumferentially arranged vertical bars 18 which rest at their lower ends on the bottom of the counterbored portion 13.

A block 19 rests on and is preferably secured to the body 10 and has a bore 20 preferably of the same diameter as the counterbored portion 13 to accommodate the cage 16.

A groove 21 can be provided in the block 19 at the lower end of the bore 20 with an annular sealing ring 22 therein.

The upper end of the bore 20 can be threaded, as at 23, and is fitted with an exteriorly threaded plug 24 having a suitable head 25. A groove 26 can be formed in the bore 20 adjacent the threaded portion 23 and an annular sealing ring 27 is placed therein. The plug 24 confines the cage 16 in the bore 20, and is provided with a passage 28 for fluid.

A helical spring 29 is mounted in the cage 16 between the ball 15 and the plug 24, and is arranged to apply a predetermined load to the ball 15.

Figure 2:
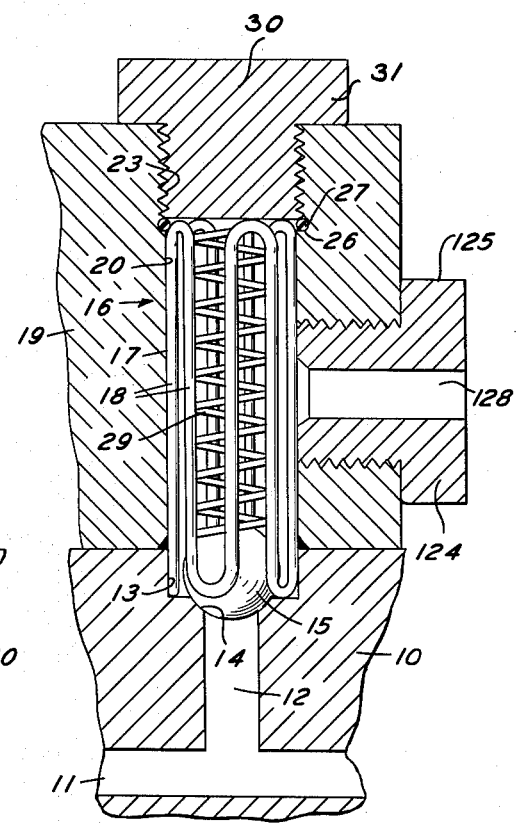
FIG. 2 is a similar view of a slightly modified arrangement.
Figure 3:
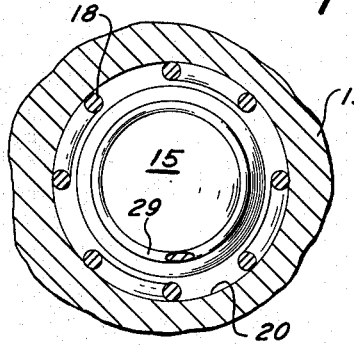
FIG. 3 is a section substantially on the line 3—3 of FIG. 1, looking in the direction of the arrows.

The modification in FIG. 2 is similar except that the opening 23 is closed by means of a solid externally threaded plug 30 having a head 31. A side bore 123 is suitably threaded to receive a threaded plug 124 having a head 125 and a fluid passage 128, which intersects the bore 20.

The cage 16 will normally be made large enough to fit the bore 20. However, if it is somewhat smaller, it will still function. Also, if it be slightly larger, it can, by virtue of the natural springiness of the wire 17, be compressed enough to fit the bore 20. The cage 19 also aids in retaining the sealing rings 22 and 26 in place in the event of suction tending to constrict them radially.

The mode of operation should be apparent from the foregoing, the valve ball 15 moving from its seat 14 and being urged toward its seat 14 by the spring 29 in the well known manner. The cage 16 permits free access and flow of fluid as required while providing a guide.

The valve herein disclosed is particularly suitable for operation at high pressures of the order of 500 p.s.i. and higher.

I claim:

1. A check valve assembly comprising a body member having a fluid passageway therein, a valve seat at an end of said fluid passageway, a valve ball engageable with said valve seat, a spring exerting pressure on said ball and urging said ball to engage said seat, a cage in surrounding relation to said spring and said ball and extending from said seat, said cage comprising a single wire bent to provide a zig-zag conformation substantially circular in transverse cross section with a plurality of parallel straight longitudinal portions having alternate end connection therebetween, and a fluid passageway leading to the opposite side of said valve seat.

2. A check valve assembly comprising a body member having a fluid passageway therein, a valve seat at an end of said fluid passageway, a counterbore in said passageway, a block having a bore therein in register with said counterbore, a valve ball engageable with said valve seat, a spring exerting pressure on said ball and urging said ball to engage said seat, a cage in said bore and counterbore surrounding said spring and said ball and extending from said seat, said cage comprising a single wire bent to provide a zig-zag conformation substantially circular in transverse cross section with a plurality of parallel straight longitudinal portions having alternate end connections therebetween, a plug in the upper end of said bore confining said cage in said bore, and a fluid passageway leading from said bore above said ball.

3. The structure as defined in claim 2, wherein the second mentioned fluid passageway extends axially through said plug.

4. The structure as defined in claim 2 wherein the second mentioned fluid passageway is normal to said bore, intermediate its ends.

References Cited by the Examiner

UNITED STATES PATENTS

| 1,570,828 | 1/1926 | Fisher | 137—539 XR |
| 1,989,199 | 1/1935 | Hummert | 137—533.13 |
| 2,746,727 | 5/1956 | Earl. | |

FOREIGN PATENTS 1,097,802  2/1955  France.

ISADOR WEIL, Primary Examiner.
WILLIAM F. O'DEA, Examiner.